(12) United States Patent
Fujita et al.

(10) Patent No.: US 6,638,375 B2
(45) Date of Patent: Oct. 28, 2003

(54) ALUMINUM BEARING ALLOY

(75) Inventors: Masahito Fujita, Aichi (JP); Yukihiko Kagohara, Aichi (JP); Koichi Yamamoto, Aichi (JP); Takayuki Shibayama, Aichi (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/911,706

(22) Filed: Jul. 25, 2001

(65) Prior Publication Data
US 2002/0034454 A1 Mar. 21, 2002

(30) Foreign Application Priority Data
Jul. 26, 2000 (JP) .................................... 2000-225548

(51) Int. Cl.$^7$ .............................................. C22C 21/00
(52) U.S. Cl. .................... 148/437; 420/548; 420/550
(58) Field of Search ................... 420/548, 550, 420/530; 148/437

(56) References Cited

U.S. PATENT DOCUMENTS 4,340,649 A * 7/1982 Nara et al. ................... 428/653
5,162,100 A * 11/1992 Tanaka et al. ............... 420/530

OTHER PUBLICATIONS

Patent Abstracts of Japan, Tatsuhiko Fukuoka et al. Pub. No. 58067841a, Date of Pub. Apr. 22, 1983.
Patent Abstracts of Japan, Tatsuhiko Fukoka et al. Pub. No. 58064332A, Date of Pub. Apr. 16, 1983.

* cited by examiner

*Primary Examiner*—George Wyszomierski
*Assistant Examiner*—Janelle Combs-Morillo
(74) *Attorney, Agent, or Firm*—Browdy and Neimark, P.L.L.C.

(57) ABSTRACT

An aluminum bearing alloy includes, by mass, 3 to 40% Sn, 0.5 to 7% Si, 0.05 to 2% Fe, balance of Al, and unavoidable impurities. In the alloy, a ternary-element intermetallic compound of Al—Si—Fe and Si particles are contained as hard particles.

14 Claims, 11 Drawing Sheets

|  | No | Al | Sn | Si | Fe | Mn | V | Mo | Cr | Co | Ni | W | Ti | Zr | Cu | Mg | Zn | Production of Al-Si-Fe intermetallic compound | |
|---|---|---|---|---|---|---|---|---|---|---|---|---|---|---|---|---|---|---|---|
|  |  |  |  |  |  |  |  |  |  |  |  |  |  |  |  |  |  | Found/ unfound | Composition of intermetallic compound |
| Prior-art product | 1 | Bal. | 20 | - | - | - | - | - | - | - | - | - | - | - | 1 | - | - | Unfound | |
|  | 2 | Bal. | 13 | 3 | - | - | - | - | 0.3 | - | - | - | - | - | 0.7 | - | - | Unfound | |
|  | 3 | Bal. | 13 | 3 | - | 0.3 | - | - | - | - | - | - | - | - | 0.8 | - | - | Unfound | |
|  | 4 | Bal. | 13 | 3 | - | 0.3 | 0.2 | - | - | - | - | - | - | - | 0.8 | - | - | Unfound | |
|  | 5 | Bal. | 10 | 2.5 | - | - | - | - | 0.2 | - | - | - | - | 0.1 | 1 | - | - | Unfound | |
|  | 6 | Bal. | 10 | 4 | - | - | - | - | 0.3 | - | - | - | 0.1 | - | 1.4 | - | - | Unfound | |
|  | 7 | Bal. | - | 6 | - | - | - | - | - | - | - | - | - | - | 1 | 0.5 | - | Unfound | |

FIG. 7A

| | No | Al | Sn | Si | Fe | Mn | V | Mo | Cr | Co | Ni | W | Ti | Zr | Cu | Mg | Zn | Found/unfound | Composition of intermetallic compound |
|---|---|---|---|---|---|---|---|---|---|---|---|---|---|---|---|---|---|---|---|
| | 8 | Bal. | 20 | 4 | 0.4 | - | - | - | - | - | - | - | - | - | 1 | - | - | Found | Al-Si-Fe system |
| | 9 | Bal. | 13 | 3 | 0.2 | - | - | - | 0.3 | - | - | - | - | - | 0.7 | - | - | Found | Al-Si-Fe-Cr system |
| | 10 | Bal. | 13 | 3 | 0.25 | 0.3 | - | - | - | - | - | - | - | - | 0.8 | - | - | Found | Al-Si-Fe-Mn system |
| | 11 | Bal. | 13 | 3 | 0.2 | 0.3 | 0.2 | - | - | - | - | - | - | - | 0.8 | - | - | Found | Al-Si-Fe-Mn-V system |
| | 12 | Bal. | 10 | 2.5 | 0.3 | - | - | - | 0.2 | - | - | - | - | - | 1 | - | - | Found | Al-Si-Fe-Cr system |
| | 13 | Bal. | 10 | 4 | 0.25 | - | - | - | 0.3 | - | - | - | 0.1 | 0.1 | 1.4 | - | - | Found | Al-Si-Fe-Cr system |
| | 14 | Bal. | 4 | 6 | 1.2 | - | - | - | - | - | - | - | - | - | 0.8 | 0.2 | 3 | Found | Al-Si-Fe system |
| Invention product | 15 | Bal. | 10 | 3 | 0.3 | - | - | 0.3 | - | - | - | - | 0.15 | - | 0.7 | - | - | Found | Al-Si-Fe-Mo system |
| | 16 | Bal. | 13 | 3 | 0.4 | 0.3 | - | - | - | - | 0.3 | - | - | - | 1.4 | - | - | Found | Al-Si-Fe-Mn-Ni system |
| | 17 | Bal. | 13 | 3 | 0.5 | 0.3 | - | - | - | 0.3 | - | - | - | - | 0.8 | - | - | Found | Al-Si-Fe-Mn-Co system |
| | 18 | Bal. | 10 | 2.5 | 1.5 | - | - | - | 0.2 | - | - | 0.2 | 0.2 | 0.1 | 1 | - | - | Found | Al-Si-Fe-Cr-V system |
| | 19 | Bal. | 10 | 4 | 1 | - | - | - | 0.3 | - | - | - | 0.1 | - | 1.4 | - | - | Found | Al-Si-Fe-Cr system |
| | 20 | Bal. | 4 | 4 | 0.3 | 0.3 | - | - | 0.2 | - | - | - | 0.2 | - | 1.2 | - | - | Found | Al-Si-Fe-Cr system |
| | 21 | Bal. | 10 | 4 | 0.15 | - | - | - | 0.3 | - | - | - | 0.1 | - | 1.4 | - | - | Found | Al-Si-Fe-Cr system |
| | 22 | Bal. | 4 | 6 | 0.1 | - | - | - | - | - | - | - | - | - | 0.8 | 0.2 | 3 | Found | Al-Si-Fe system |
| | 23 | Bal. | 10 | 4 | 1 | - | - | - | 0.3 | - | - | - | 0.1 | - | 1.4 | - | - | Found | Al-Si-Fe-Cr system |
| | 24 | Bal. | 13 | 3 | 0.4 | 0.3 | - | - | - | - | 0.3 | - | - | - | 1.4 | - | - | Found | Al-Si-Fe-Mn-Ni system |
| | 25 | Bal. | 13 | 3 | 0.5 | 0.3 | - | - | - | 0.3 | - | - | 0.2 | - | .2 | 0.5 | 1.5 | Found | Al-Si-Fe-Mn-Co system |

| | No | Si particle | | | Al-Si-Fe intermetallic compound | | |
|---|---|---|---|---|---|---|---|
| | | Particle diameter (μm) | Shape of particle | | Particle diameter (μm) | Shape of particle | |
| | | 0 2 4 6 8 10 | Rounded | Square | 0 2 4 6 8 10 | Rounded | Square |
| Prior-art Product | 1 | | | | | | |
| | 2 | ↕ (≈2–4) | ○ | | | | |
| | 3 | ↕ (≈1–4) | ○ | | | | |
| | 4 | ↕ (≈1–5) | ○ | | | | |
| | 5 | ↕ (≈2–6) | ○ | | | | |
| | 6 | ↕ (≈2–7) | ○ | | | | |
| | 7 | ↕ (≈2–7) | ○ | | | | |
| Invention Product | 8 | ↕ (≈1–6) | ○ | | ↕ (≈2–4) | | ○ |
| | 9 | ↕ (≈2–5) | ○ | | ↕ (≈2–6) | | ○ |
| | 10 | ↕ (≈2–5) | ○ | | ↕ (≈2–6) | | ○ |
| | 11 | ↕ (≈2–6) | ○ | | ↕ (≈2–6) | | ○ |
| | 12 | ↕ (≈2–6) | ○ | | ↕ (≈2–7) | | ○ |
| | 13 | ↕ (≈2–7) | ○ | | ↕ (≈2–7) | | ○ |
| | 14 | ↕ (≈2–7) | ○ | | ↕ (≈2–8) | | ○ |
| | 15 | ↕ (≈1–4) | ○ | | ↕ (≈2–8) | | ○ |
| | 16 | ↕ (≈2–5) | ○ | | ↕ (≈3–9) | | ○ |
| | 17 | ↕ (≈1–4) | ○ | | ↕ (≈2–5) | | ○ |
| | 18 | ↕ (≈1–3) | ○ | | ↕ (≈2–7) | | ○ |
| | 19 | ↕ (≈2–5) | ○ | | ↕ (≈2–8) | | ○ |
| | 20 | ↕ (≈2–4) | ○ | | ↕ (≈2–8) | | ○ |
| | 21 | ↕ (≈2–5) | ○ | | ↕ (≈2–8) | | ○ |
| | 22 | ↕ (≈2–5) | ○ | | ↕ (≈2–8) | | ○ |
| | 23 | ↕ (≈2–5) | ○ | | ↕ (≈2–7) | | ○ |
| | 24 | ↕ (≈1–4) | ○ | | ↕ (≈2–9) | | ○ |
| | 25 | ↕ (≈1–4) | ○ | | ↕ (≈2–8) | | ○ |

|  | No | Al | Sn | Si | Fe | Mn | V | Mo | Cr | Co | Ni | W | Ti | Zr | Cu | Mg | Zn | Heat treatment * | Specific load of fatigue occurrence MPa | Specific load of seizure occurrence MPa | Wear amount μm |
|---|---|---|---|---|---|---|---|---|---|---|---|---|---|---|---|---|---|---|---|---|---|
| Prior-art Product | 1 | Bal. | 20 | - | - | - | - | - | - | - | - | - | - | - | 1 | - | - | No | 60 | 75 | 20 |
| | 2 | Bal. | 13 | 3 | - | - | - | - | 0.3 | - | - | - | - | - | 0.7 | - | - | No | 105 | 65 | 13 |
| | 3 | Bal. | 13 | 3 | - | 0.3 | - | - | - | - | - | - | - | - | 0.8 | - | - | No | 95 | 70 | 12 |
| | 4 | Bal. | 13 | 3 | - | 0.3 | 0.2 | - | - | - | - | - | - | - | 0.8 | - | - | No | 100 | 65 | 15 |
| | 5 | Bal. | 10 | 2.5 | - | - | - | - | 0.2 | - | - | - | - | 0.1 | 1 | - | - | No | 110 | 60 | 10 |
| | 6 | Bal. | 10 | 4 | - | - | - | - | 0.3 | - | - | - | 0.1 | - | 1.4 | - | - | No | 105 | 70 | 14 |
| | 7 | Bal. | - | 6 | - | - | - | - | - | - | - | - | - | - | 1 | 0.5 | - | No | 115 | 70 | 12 |

\* Where the heat treatment includes the solid solution treatment at 470°C for 20 minutes and the aging treatment at 170°C for 15 hours.

FIG. 9A

| | No | Al | Sn | Si | Fe | Mn | V | Mo | Cr | Co | Ni | W | Ti | Zr | Cu | Mg | Zn | Heat treatment * | Specific load of fatigue occurrence MPa | Specific load of seizure occurrence MPa | Wear amount μm |
|---|---|---|---|---|---|---|---|---|---|---|---|---|---|---|---|---|---|---|---|---|---|
| Invention Product | 8 | Bal. | 20 | 4 | 0.4 | - | - | - | - | - | - | - | - | - | 1 | - | - | No | 125 | 80 | 12 |
| | 9 | Bal. | 13 | 3 | 0.2 | - | - | - | 0.3 | - | - | - | - | - | 0.7 | - | - | No | 105 | 80 | 7 |
| | 10 | Bal. | 13 | 3 | 0.25 | 0.3 | - | - | - | - | - | - | - | - | 0.8 | - | - | No | 115 | 85 | 8 |
| | 11 | Bal. | 13 | 3 | 0.2 | 0.3 | 0.2 | - | - | - | - | - | - | - | 0.8 | - | - | No | 120 | 80 | 5 |
| | 12 | Bal. | 10 | 2.5 | 0.3 | - | - | - | 0.2 | - | - | - | - | 0.1 | 1 | - | - | No | 120 | 75 | 3 |
| | 13 | Bal. | 10 | 4 | 0.25 | - | - | - | 0.3 | - | - | - | 0.1 | - | 1.4 | - | - | No | 125 | 85 | 6 |
| | 14 | Bal. | 4 | 6 | 1.2 | - | - | - | - | - | - | - | - | - | 0.8 | 0.2 | 3 | No | 130 | 85 | 8 |
| | 15 | Bal. | 10 | 3 | 0.3 | - | - | 0.3 | - | - | - | - | 0.15 | - | 0.7 | - | - | No | 125 | 75 | 5 |
| | 16 | Bal. | 13 | 3 | 0.4 | 0.3 | - | - | 0.2 | 0.3 | 0.3 | - | - | - | 1.4 | - | - | No | 130 | 80 | 9 |
| | 17 | Bal. | 13 | 3 | 0.5 | 0.3 | - | - | 0.3 | - | - | 0.2 | - | - | 0.8 | - | - | No | 135 | 85 | 4 |
| | 18 | Bal. | 10 | 2.5 | 1.5 | - | - | - | 0.2 | - | - | - | 0.1 | 0.1 | 1 | - | - | No | 125 | 85 | 8 |
| | 19 | Bal. | 10 | 4 | 1 | - | - | - | 0.3 | - | - | - | 0.2 | - | 1.4 | - | - | No | 130 | 75 | 7 |
| | 20 | Bal. | 4 | 4 | 0.3 | 0.3 | - | - | - | - | - | - | 0.1 | - | 1.2 | - | - | No | 120 | 85 | 9 |
| | 21 | Bal. | 10 | 4 | 0.15 | - | - | - | - | - | - | - | - | - | 1.4 | - | - | No | 130 | 85 | 5 |
| | 22 | Bal. | 4 | 6 | 0.1 | - | - | - | 0.3 | - | - | - | 0.1 | - | 0.8 | 0.2 | 3 | Yes | 120 | 85 | 7 |
| | 23 | Bal. | 10 | 4 | 1 | - | - | - | - | - | - | - | - | - | 1.4 | - | - | Yes | 135 | 80 | 6 |
| | 24 | Bal. | 13 | 3 | 0.4 | 0.3 | - | - | - | 0.3 | 0.3 | - | - | - | 1.4 | - | - | Yes | 135 | 85 | 7 |
| | 25 | Bal. | 13 | 3 | 0.5 | 0.3 | - | - | - | - | - | - | 0.2 | - | 2 | 0.5 | 1.5 | Yes | 140 | 85 | 3 |

\* Where the heat treatment includes the solid solution treatment at 470°C for 20 minutes and the aging treatment at 170°C for 15 hours.

ALUMINUM BEARING ALLOY

BACKGROUND OF THE INVENTION

1. Field of the Invention

This invention relates to an aluminum bearing alloy generally used in bearings for high-power engines of automobiles and industrial machines.

2. Description of Related Art

An aluminum bearing alloy of the above-described type usually contains Sn giving conformability thereto. Pb also gives conformability to the aluminum bearing alloy. However, Pb cannot easily be distributed uniformly in the alloy and is one of injurious metals. Pb is not used for these reasons.

A plate-shaped cast aluminum bearing alloy containing Sn is cladded to a back steel plate to thereby be used for bearing. In manufacturing bearings using the aforesaid aluminum bearing alloy, annealing is indispensable after cladding to improve the toughness of the bearing alloy and the adhesive strength between the bearing alloy and the back steel plate. When annealing places the aluminum bearing alloy containing Sn under the condition of a high temperature, Al grains and Sn phases in the alloy structure are coarsened such that a high-temperature hardness and a fatigue strength of the aluminum bearing alloy are reduced.

In view of the aforesaid problem, it has been suggested that minute hard particles, for example, Si particles having a diameter less than 5 μm should be contained in the aluminum alloy so that Sn phases and Al grains are prevented from being coarsened and so that an Al matrix is strengthened, whereupon the aluminum bearing alloy provides a high bearing performance under the conditions of high load and high temperature.

Furthermore, each of JP-A-58-64332 and JP-A-58-67841 proposed containment of hard particles from a point of view different from strengthening the Al matrix for the same purpose as described above. The former, JP-A-58-64332, discloses that Si particles are used as hard particles and that the size and distribution of the Si particles are controlled so that the bearing characteristics, particularly conformability and anti-seizure property are rapidly improved under the conditions of high load and high temperature. Conventional Si particles mainly have a diameter of less than 5 μm. However, coarsened Si particles having a diameter ranging between 5 and 40 μm can be obtained as the result of improvements in the conditions of the thermal treatment etc. The coarsened Si particles scrape off protrusions on the surface of the shaft and an edge such as burrs around nodular graphite on the surface of the shaft at an initial stage of sliding, resulting in smooth sliding of the bearing (lapping). Consequently, seizure is prevented even under the condition of high load, whereupon the anti-seizure property can rapidly be improved.

On the other hand, the latter publication, JP-A-58-67841, discloses that particles consisting of or including at least one of Mn, Fe, Mo, Ni, Zr, Co, Ti, Sb, Cr, and Nb are crystallized as a separate metal or deposited or yielded as an intermetallic compound containing Mn or the like with Al. It is further disclosed that the crystallized separate metal or deposited intermetallic compound having a diameter ranging between 5 and 40 μm has the same effect as the Si particles in the above-described JP-A-58-46332. For example, when added to an Al alloy, Mn or the like is crystallized as a separate metal, or hard particles containing Mn or the like certainly exist although no crystalline can be specified. Thus, JP-A-58-46332 suggests Mn, Fe, etc. as an element accelerating generation of hard particles in an alloy excluding Si.

Regarding an alloy containing Si, only Si particles are conventionally hard particles crystallized in the aluminum bearing alloy. Regarding an alloy excluding Si, an added metal is crystallized in its original condition or crystallization of a binary intermetallic compound is suggested without crystallized substance being specified. Additionally, coarsened hard particles cause the lapping of the shaft, whereupon anti-seizure property is improved.

Hard particles contained in Al are generally distributed uniformly for the strengthening purpose. A large effect is achieved as the size of the particles becomes smaller. Accordingly, when the hard particles such as Si are coarsened as in the aforesaid publications, the strength of the Al matrix is reduced such that the fatigue resistance is reduced. In other words, regarding the size of crystallized particles, when the diameter of the crystallized particles is reduced in order that the fatigue resistance may be improved, the anti-seizure property cannot be improved. On the contrary, when the diameter of the crystallized particles is increased in order that the anti-seizure property may be improved, the fatigue resistance cannot be improved.

SUMMARY OF THE INVENTION

Therefore, an object of the present invention is to provide an aluminum bearing alloy in which the anti-seizure property thereof can be improved by hard particles without reduction in the fatigue resistance thereof.

The above-described object can be achieved by crystallizing a ternary-element intermetallic compound of Al—Si—Fe or a multi-element intermetallic compound with the base of Al—Si—Fe in an aluminum bearing alloy. More specifically, the present invention provides an aluminum bearing alloy comprising, by mass, 3 to 40% Sn, 0.5 to 7% Si, 0.05 to 2% Fe, balance of Al, and unavoidable impurities, wherein a ternary-element intermetallic compound of Al—Si—Fe and Si particles are contained as hard particles.

In a first preferred form, the aluminum bearing alloy further comprises at least one or more of Mn, V, Mo, Cr, Co, Ni and W in an amount or a total amount of 0.01 to 3%. In the alloy, said one or more of Mn, V, Mo, Cr, Co, Ni and W are added to the Al—Si—Fe such that a multi-element intermetallic compound is contained as hard particles.

In a second preferred form, the hard particles have a maximum diameter ranging between 1 and 20 μm on a bearing surface and a number of the hard particles for every 1 mm$^2$ ranges between 6 and 100.

In a third preferred form, the alloy contains by mass, 0.01 to 2% of at least one or more of B, Ti and Zr.

In a fourth preferred form, the alloy contains by mass, 0.1 to 5% of at least one or more of Cu, Mg and Zn.

Crystallization of the intermetallic compound of Al—Si—Fe will now be described. Firstly, in a well-konwn ternary-element state of Al—Si—Fe, a ternary-element eutectic compound is in the phase of Fe$_2$Al$_9$Si$_2$ and has a crystallizing temperature of 573° C. A eutectic reaction is shown as L→Sn+Si+Fe$_2$Al$_9$Si$_2$.

FIG. 1 shows the structure of an alloy of Al—Sn—Si—Fe in the invention claimed in claim 1. As obvious from FIG. 1, a ternary-element intermetallic compound of Al—Si—Fe is crystallized as a eutectic compound in the shape of a needle, bar or plate. FIG. 2 shows the structure of an alloy in the invention claimed in claim 2, for example, an alloy of Al—Sn—Si—Fe—Mn. A multi-element intermetallic compound of Al—Si—Fe—Mn is seen in FIG. 2. FIG. 3 shows the structure of an alloy of Al—Sn—Si—Fe—Cr. A multi-element intermetallic compound of Al—Si—Fe—Cr is seen in FIG. 3.

A multi-element intermetallic compound such as Al—Si—Fe—Mn or Al—Si—Fe—Cr has various forms and is crystallized as a eutectic compound in which compounds including those having shapes of a needle, bar and plate each with three-dimensionally unspecified thickness are combined together in a complicated form. The ternary-element intermetallic compound of Al—Si—Fe and the multi-element intermetallic compound containing Al—Si—Fe as a base are exceedingly stable, and its basic shape is not changed even by the heat treatment after cladding with a back metal. These intermetallic compounds differ from an alloy containing only Si. More specifically, Si crystallizes as a eutectic in the form like a three-dimensionally connected coral. The crystallized Si is crushed to pieces by rolling after casting or rolling in the cladding with the back metal. Further, Si also changes its form by a subsequent heat treatment. This is a characteristic of Si and particularly in the heat treatment in which the temperature exceeds 300° C., Si changes into a relatively rounded so that a surface tension thereof is reduced. This tendency is enhanced in a material containing a large amount of Sn, for example, an Al—Sn bearing alloy.

However, the aforesaid ternary intermetallic compound or multi-element intermetallic compound in the present invention does not change its crystallized form and does not change its form at a temperature for a usual heat treatment. Further, the ternary or multi-element intermetallic compound is crushed in the rolling step with plastic deformation or the cladding step during manufacture of the bearing. However, as the result of crush, the intermetallic compound takes a form with a sharp edge such as a broken piece of an edged tool. FIGS. 4 to 6 show an example of such a form. Although Si particles are rounded and broken into pieces through the steps of rolling and heat treatment, the aforesaid ternary or multi-element intermetallic compound retains an aggressive form with a sharp edge.

The ternary or multi-element intermetallic compound has a lapping effect on a counter shaft even when its amount is small. Particularly, the ternary or multi-element intermetallic compound stabilizes the relationship between a shaft with an unstable initial wear and a bearing. Thus, the ternary or multi-element intermetallic compound is effective in improving the conformability. More concretely, the ternary or multi-element intermetallic compound scrapes off protrusions on the surface of the counter shaft and an edge such as burrs around nodular graphite on the surface of the counter shaft. The ternary or multi-element intermetallic compound further prevents the Al bearing alloy from wear due to adhesion to the counter shaft, which is a disadvantage of the Al bearing alloy. Additionally, the ternary or multi-element intermetallic compound further scrapes away an adherent matter to thereby prevent seizure due to the adherent matter. Moreover, the ternary or multi-element intermetallic compound is relatively large even after the rolling step. Minutely pulverized Si particles are distributed in the Al matrix, thereby improving the strength of the Al matrix. Consequently, both improvement in the wear resistance and anti-seizure property and improvement in the fatigue strength can be achieved.

In order that the intermetallic compound having the aforesaid effect may scrape off the adherent matter on the shaft, the hard particles preferably have a maximum diameter ranging between 1 and 20 $\mu$m on a bearing surface and a number of the hard particles for every 1 mm$^2$ preferably ranges between 6 and 100, as recited in claim 3. Further, the Si particles preferably have a maximum diameter which is less than 0.5 $\mu$m and a number of the Si particles for every 1 mm$^2$ is preferably at or above 200.

The reasons for the amount limitation of each aforesaid component will be described below.

(1) Sn (3 to 40 mass %)

Sn improves surface properties such as anti-seizure property, conformability and embeddability as a bearing. When the Sn content is less than 3%, the above-mentioned effects are small. When it exceeds 40%, mechanical properties of the bearing alloy are deteriorated with the result of reduction in the bearing performance. A preferable Sn content ranges between 6 and 20%.

(2) Si (0.5 to 7 mass %)

Si dissolves in the aluminum matrix and particularly crystallizes as a single substance of silicon particle to disperse finely, so as to enhance the fatigue strength of the material and serve to improve the anti-seizure property and wear resistance. On the other hand, Si is an essential element in order to form the Al—Si—Fe intermetallic compound and improves the lapping, anti-seizure property, and wear resistance. When the Si content is less than 0.5%, Si dissolves into the Al matrix such that the above effects are small. When it exceeds 7%, its crystal is coarsened, so as to reduced the fatigue strength of the bearing alloy. A preferable Si content ranges between 2 and 6%.

(3) Fe (0.05 to 2 mass %)

Fe crystallizes mainly as the Al—Si—Fe intermetallic compound, so as to produce the above-described effects. The intermetallic compound containing Fe prevents seizure with a counter shaft and improves the wear resistance. The characteristic is effective when the Fe content ranges between 0.05 and 2%. When the Fe content is less than 0.05%, the above-mentioned effects are small. When the Fe content exceeds 2%, the compound is coarsened and the bearing alloy becomes brittle, whereupon the rolling work causes trouble. A preferable Fe content ranges between 0.07 and 1%.

(4) Mn, V, Mo, Cr, Co, Ni, and W (at least one element of these: 0.01 to 3 mass % in a total amount)

These are optional elements which constitute the multi-Element intermetallic compound in the present invention. More specifically, when a selected element $\alpha$ is added to Al—Si—Fe, a multi-element intermetallic compound of Al—Si—Fe—$\alpha$ is produced. The selected element dissolves in the aluminum matrix as a single substance to thereby strengthen the matrix. Effects of the multi-element intermetallic compound cannot be expected when the content of each element is less than 0.01%. When the content of each element exceeds 3%, the multi-element intermetallic compound is excessively coarsened such that the physical properties of the bearing alloy are degraded and plastic workability of the bearing alloy such as rolling is degraded. A preferable content ranges between 0.2 and 2%.

(5) B, Ti and Zr (at least one of these elements: 0.01 to 2 mass % in a total amount)

These optional elements do not contribute to formation of the Al—Si—Fe intermetallic compound, dissolving in the aluminum matrix, so as to improve the fatigue strength of the bearing alloy. The aforesaid effect is small when the content is less than 0.01%. when the content exceeds 2%, the bearing alloy becomes brittle. A preferable content ranges between 0.02 and 0.5%.

(6) Cu, Mg, and Zn (at least one of these: 0.1 to 5 mass % in a total amount)

These optional elements are additional elements which improve the strength of the aluminum matrix. A solid solution treatment forces these elements to dissolve in the aluminum matrix. When the matrix dissolved these elements are cooled and aged, fine compounds can be precipitated. The effects cannot be expected when the additive amount is less than 0.1%. When the additive amount exceeds 5%, the compound becomes coarse. A preferable additive amount ranges between 0.5 and 4%.

BRIEF DESCRIPTION OF THE DRAWINGS

Other objects, features and advantages of the present invention will become clear upon reviewing the following description of a preferred embodiment, made with reference to the accompanying drawings, in which:

FIGS. 7A and 7B show results of examinations concerning the presence or absence and the composition of intermetallic compound of Al—Si—Fe;

FIG. 8 shows results of examinations concerning grain diameter and shape of Si particles, and grain diameter and shape of intermetallic compound of Al—Si—Fe; and FIGS. 9A and 9B show results of fatigue, seizure and wear tests.

DETAILED DESCRIPTION OF A PREFERRED EMBODIMENT

Figure 1:
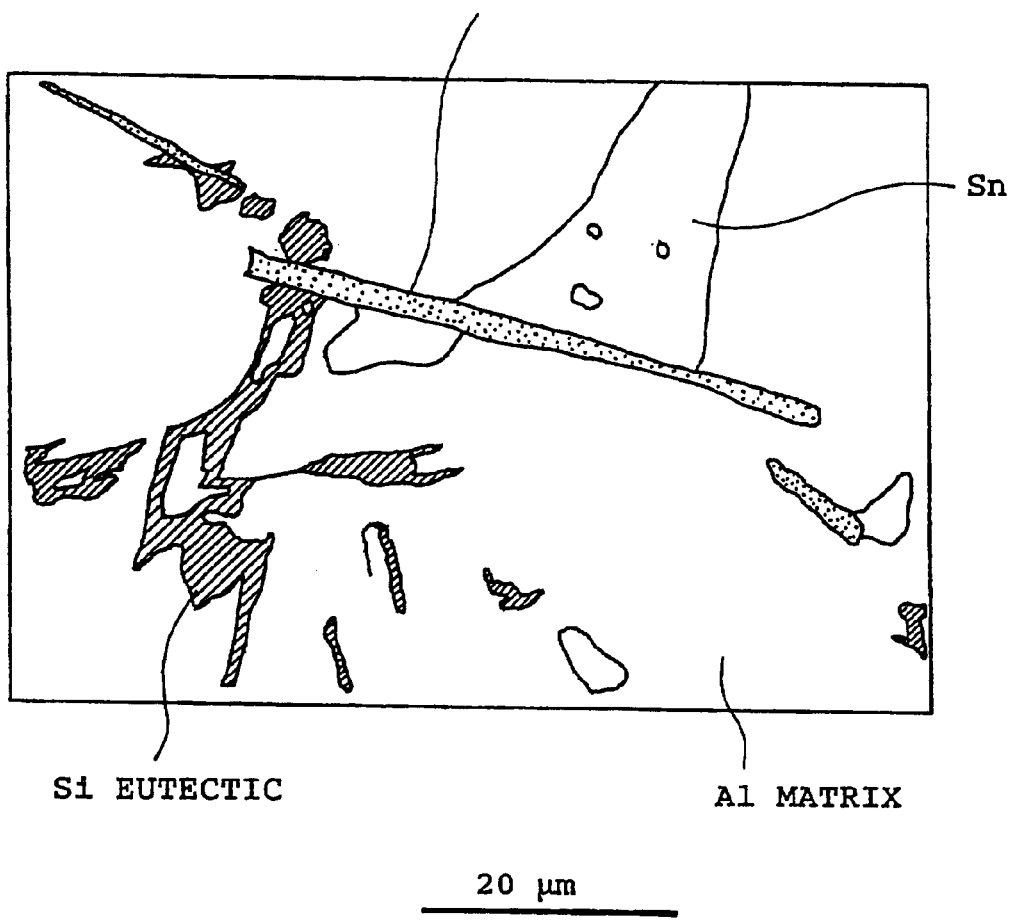
FIG. 1 is an illustration showing a microphotograph of an Al alloy having crystallized a ternary-element intermetallic compound of Al—Si—Fe.
Figure 2:
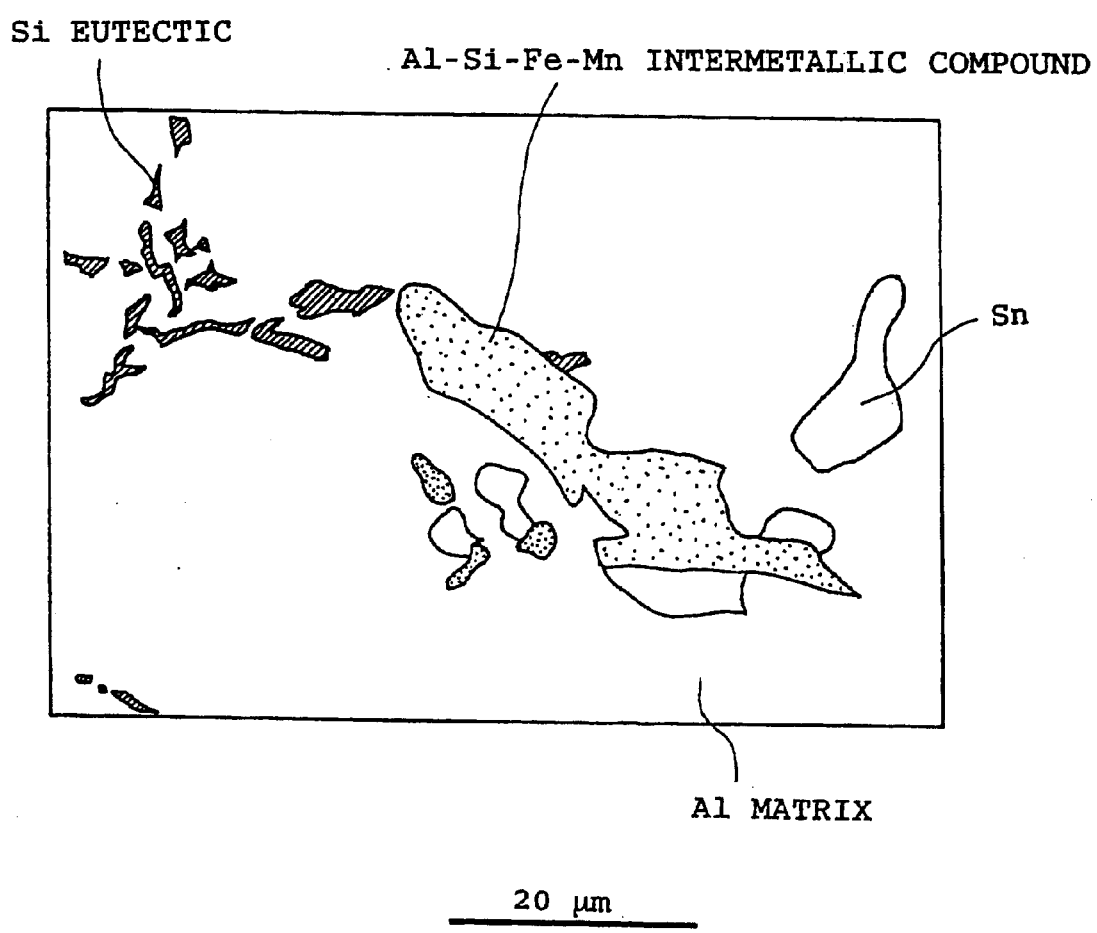
FIG. 2 is an illustration showing a microphotograph of an Al alloy having crystallized a multi-element intermetallic compound of Al—Si—Fe—Mn.
Figure 3:
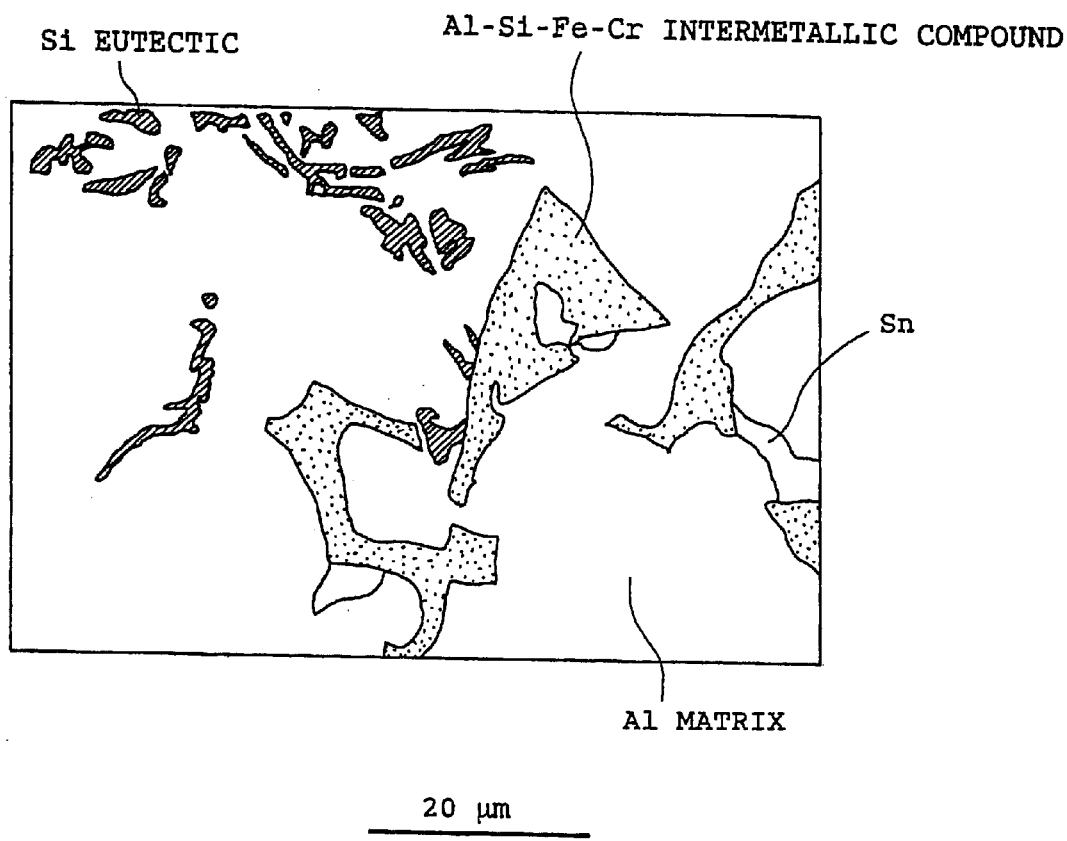
FIG. 3 is an illustration showing a microphotograph of an Al alloy having crystallized a multi-element intermetallic compound of Al—Si—Fe—Cr.
Figure 4:
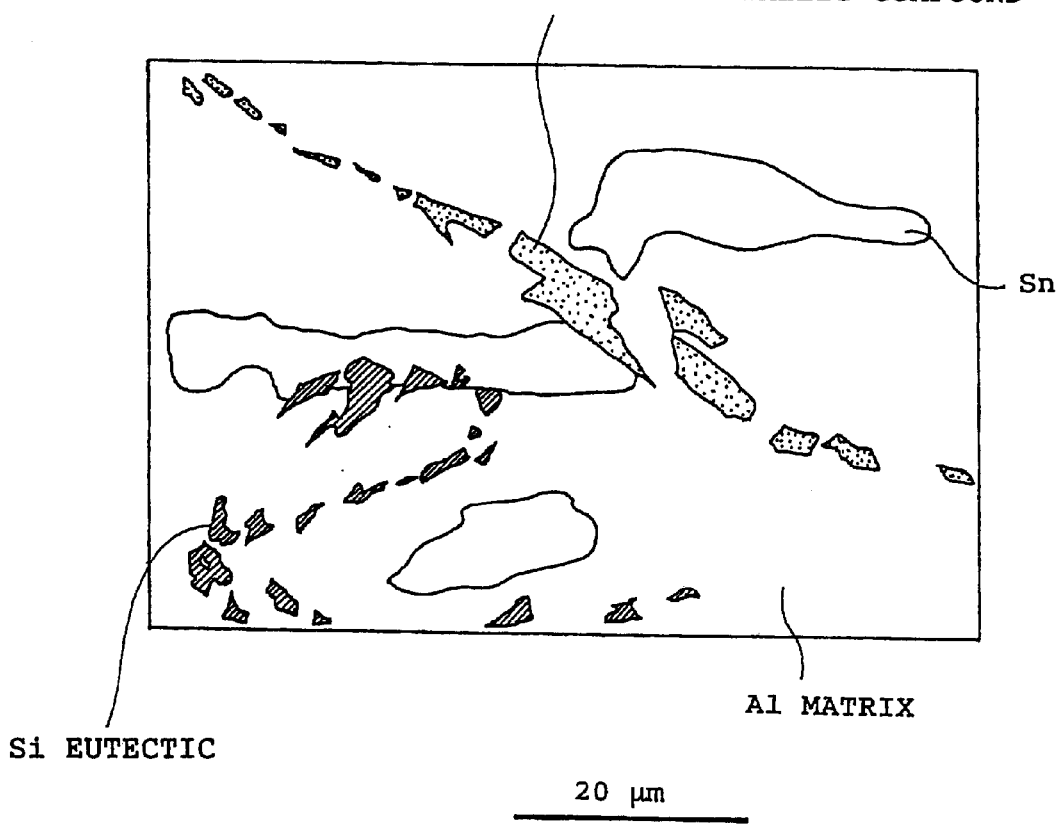
FIG. 4 is an illustration of a microphotograph of an Al alloy including a ternary-element intermetallic compound of Al—Si—Fe, showing the state of the alloy after rolling.
Figure 5:
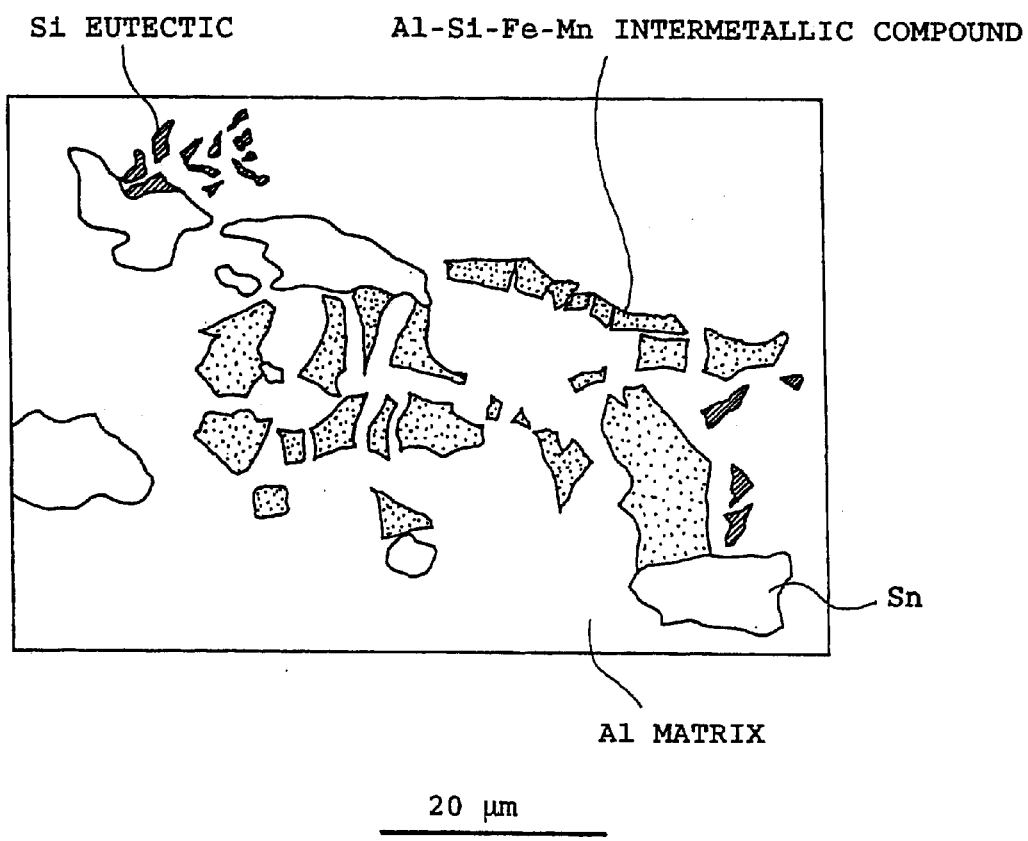
FIG. 5 is an illustration of a microphotograph of an Al alloy including a multi-element intermetallic compound of Al—Si—Fe—Mn, showing the state of the alloy after rolling.
Figure 6:
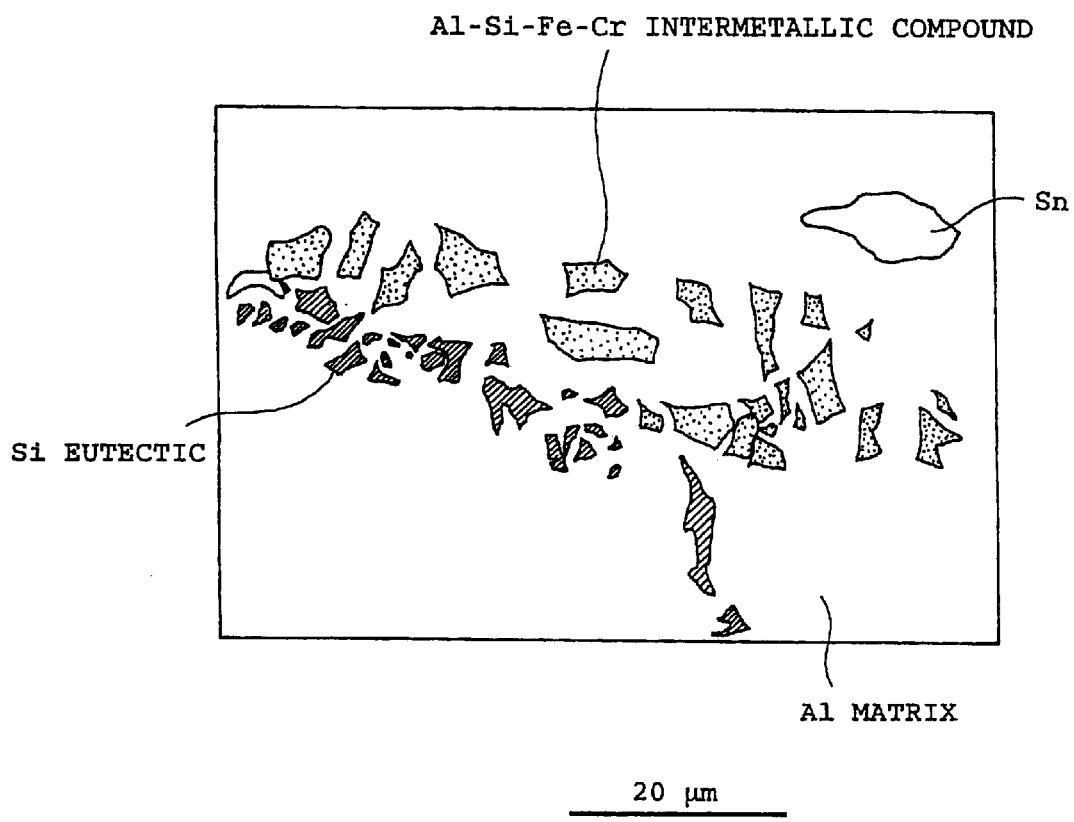
FIG. 6 is an illustration of a microphotograph of an Al alloy including a multi-element intermetallic compound of Al—Si—Fe—Cr, showing the state of the alloy after rolling.

The invention will be described by way of one preferred embodiment. A bearing manufacturing method will first be described. An aluminum bearing alloy having the composition as shown in FIG. 7B is melted and formed into a plate with a thickness of 15 mm by continuous casting. In the aluminum bearing alloy plate formed by the continuous casting, a ternary-element intermetallic compound of Al—Si—Fe is crystallized as shown in FIG. 1 or a multi-element intermetallic compound of Al—Si—Fe and one or more elements of Mn, V, Mo, Cr, Co, Ni and W is crystallized as shown in FIG. 2 or 3. Further, Si particles are precipitated. The alloy plate is quenched in the aforesaid casting step. A cooling rate is controlled so that the size of the crystallized intermetallic compound preferably ranges between 40 and 55 μm. Further, the size of an Si eutectic structure is preferably less than 40 μm in the casting stage.

A treatment is carried out for scraping off segregated portions from the surface of the continuously cast aluminum bearing alloy plate. Thereafter, the alloy plate is continuously rolled by cold rolling so as to have a thickness of 6 mm. A aluminum foil plate for provision of a bonding layer is cladded on the aluminum bearing alloy plate. The alloy plate is then cladded on a backing steel plate so that a bimetal is manufactured. Annealing is subsequently carried out to increase the bonding strength between the alloy plate and the backing steel plate. Thereafter, a solid solution treatment is carried out to strengthen the alloy. In the solid solution treatment, the bimetal is left in the atmosphere at 470° C. for 20 minutes. After water quenching, an aging treatment is carried out for the alloy in the bimetal. The bimetal is left in the atmosphere at 170° C. for 15 hours in the aging treatment.

The intermetallic compound is crushed as the result of execution of the aforesaid rolling etc. such that its size is reduced from the initial one ranging between 40 and 55 μm to a range of 1 to 20 μm. As a result, the intermetallic compound is formed into an angular shape with sharp edges. Further, 6 to 100 hard particles consisting of the intermetallic compound are distributed per square millimeter. The size and distribution of the hard particles remain almost unchanged even after a subsequent heat treatment. On the other hand, the Si particles are also crushed by the rolling etc. After the aging treatment, the Si particle finally has a rounded shape with its maximum diameter being less than 5 μm, and 200 or more Si particles are distributed per square millimeter. Subsequently, the bimetal is machined into a semi-cylindrical or half bearing. Two such half bearings are butted against each other into a cylinder for the use with an engine.

FIGS. 7A and 7B show conventional products 1 to 7 and present invention products 8 to 25 made of aluminum alloys having respective compositions shown therein through the above-described steps. Regarding each of the products 1 to 25, the inventors examined the presence or absence of the intermetallic compound of Al—Si—Fe and the composition of the compound. FIGS. 7A and 7B also show the results of the examination. Regarding each product, the inventors also examined a grain diameter (maximum diameter) and shape of the Si particles and a grain diameter and shape of the intermetallic compound of Al—Si—Fe. FIG. 8 also shows the results of the examination. Additionally, the inventors conducted fatigue, seizure and wear tests for each of the products 1 to 25. FIGS. 9A and 9B show the results of the tests. In FIGS. 9A and 9B, a heat treatment includes the solid solution treatment (at 470° C. for 20 minutes) and the aging treatment (at 170° C. for 15 hours). TABLES 1 to 3 show the conditions of the fatigue, seizure and wear tests respectively.

TABLE 1

| Test conditions Fatigue test | |
|---|---|
| Testing machine | Fatigue testing machine |
| Revolution | 3250 rpm |
| Circumferential speed | 9.0 m/sec |
| Test time | 20 hours |
| Oil inlet temperature | 100° C. |
| Oil supply pressure | 0.49 Mpa |
| Lubricant oil | VG68 |
| Shaft material | JIS-S55C |
| Evaluation method | Maximum specific load without fatigue occurrence |

TABLE 2

| Test conditions Seizure test | |
|---|---|
| Revolution | 7200 rpm |
| Circumferential speed | 20 m/sec |
| Test load | Increased 10 MPa every 10 minutes |
| Oil inlet temperature | 100° C. |
| Oil flow | 150 ml/min |
| Lubricant oil | VG22 |
| Shaft material | JIS-S55C |

TABLE 2-continued

Test conditions
Seizure test

| Evaluation method | Seizure occurrence is judged when the temperature of back face of the bearing exceeds 200° C. or when torque fluctuations cause a shaft driving belt to slip |
|---|---|

TABLE 3

Test conditions
Wear test

| Revolution | 1000 rpm |
|---|---|
| Circumferential speed | 1.0 m/sec |
| Test load | 10 Mpa |
| Test time | 10 hours |
| | Run: 60 sec Stop: 30 sec |
| Oil flow | 2 ml/min |
| Lubricant oil | VG22 |
| Shaft material | JIS-S55C |

As obvious from FIGS. 9A and 9B, the invention products are as good as or better than the prior art products in the fatigue resistance, anti-seizure property and wear resistance. The reason for this is considered to be the lapping effect of the ternary-element and multi-element intermetallic compounds with sharp edges and increased strength of the Al matrix due to distribution of the minute Si particles. Further, particularly in the invention products 21 to 25 to each of which the solid solution treatment and aging treatment are applied, Cu, Mg, Zn, etc. is dissolved in the Al matrix (solid solution) such that the strength of the matrix can be improved. Further, each of the products 21 to 25 has a better fatigue resistance because of an improvement in the strength by hardening.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An aluminum bearing alloy comprising, by mass, 3 to 40% Sn, 0.5 to 7% Si, 0.05 to 2% Fe, balance of Al, and unavoidable impurities, said bearing alloy having been melted and cast to form a casting, quenched and thereafter machined into an aluminum bearing alloy layer,
wherein a ternary-element intermetallic compound of Al—Si—Fe and Si particles are contained in said aluminum bearing alloy as hard particles,
wherein said aluminum bearing alloy is substantially free of Pb, and
wherein the hard particles have been formed by quenching the casting so as to have a diameter ranging between 40 and 50 μm and the hard particles at the surface have been crushed such that they have a maximum diameter ranging between 1 and 20 μm on a surface of said bearing alloy layer, and a number of the hard particles for every 1 mm² ranges between 6 and 100 by said casting having been machined after quenching to crush the hard particles.

2. An aluminum bearing alloy according to claim 1, further comprising at least one or more of Mn, V, Mo, Cr, Co, Ni or W in an amount or a total amount of 0.01 to 3%, wherein said one or more of Mn, V, Mo, Cr, Co, Ni or W are added to the Al—Si—Fe such that a muli-element intermetallic compound is contained as hard particles.

3. An aluminum bearing alloy according to claim 2, wherein the hard particles have a maximum diameter ranging between 1 and 29 μm on a beating surface and a number of the hard particles for every 1 mm² ranges between 6 and 100.

4. An aluminum bearing alloy according to claim 3, further comprising at least one or more of B, Ti or Zr in a total amount, by mass, of 0.01 to 2%.

5. An aluminum bearing alloy according to claim 3, further comprising at least one or more of Cu, Mg or Zn in a total amount, by mass, of 0.1 to 5%.

6. An aluminum bearing alloy according to claim 4, further comprising at least one or more of Cu, Mg or Zn in a total amount, by mass, of 0.1 to 5%.

7. An aluminum bearing alloy according to claim 2, further comprising at least one or more of B, Ti or Zr in a total amount, by mass, of 0.01 to 2%.

8. An aluminum bearing alloy according to claim 4, further comprising at least one or more of Cu, Mg or Zn in a total amount, by mass, of 0.1 to 5%.

9. An aluminum bearing alloy according to claim 2, further comprising at least one or more of Cu, Mg or Zn in a total amount, by mass, of 0.1 to 5%.

10. An aluminum bearing alloy according to claim 1, further comprising at least one or more of B, Ti or Zr in a total amount, by mass, of 0.01 to 2%.

11. An aluminum bearing alloy according to claim 10, further comprising at least one or more of Cu, Mg or Zn in a total amount, by mass, of 0.1 to 5%.

12. An aluminum bearing alloy according to claim 1, further comprising at least one or more of Cu, Mg or Zn in a total amount, by mass, of 0.1 to 5%.

13. The aluminum bearing alloy of claim 1 which is substantially free of Sb.

14. An aluminum bearing alloy having a surface and consisting of, by mass, 6 to 20% Sn, 2 to 6% Si, 0.07 to 1% Fe, balance of Al, and unavoidable impurities, wherein a ternary-element intermetallic compound of Al—Si—Fe and Si particles are contained as hard particles with said hard particles of said Al—Si—Fe compound at the surface having sharp edges, and optionally (1) one or more of Mn, V, Mo, Cr, Co, Ni and W in a total amount of 0.01% to 3%, (2) one or more of B, Ti or Zr in a total amount of 0.01% to 2%, (3) one or more of Mn, V, Mo, Cr, Co, Ni or W in a total amount of 0.01% to 3%, and one or more of B, Ti or Zr in a total amount of 0.01% to 2%, (4) one or more of Cu, Mg or Zn in a total amount of 0.1 to 5%, (5) one or more of Mn, V, Mo, Cr, Ca, Ni or W in a total amount of 0.01% to 3%, and one or more of Cu, Mg or Zn in a total amount of 0.1 to 5%, (6) one or more of B, Ti or Zr in a total amount of 0.01% to 2%, and one or more of Cu, Mg or Zn in a total amount of 0.1 to 5%, or (7) one or more of Mn, V, Mo, Cr, Co, Ni or W in a total amount of 0.01% to 3%, and one or more of B, Ti or Zr in a total amount of 0.01% to 2%, and one or more of Cu, Mg or Zn in a total amount of 0.1 to 5%.

* * * * *